Oct. 12, 1948.　　　M. C. TATE　　　2,451,451
WEIGHING SYSTEM
Filed July 20, 1944
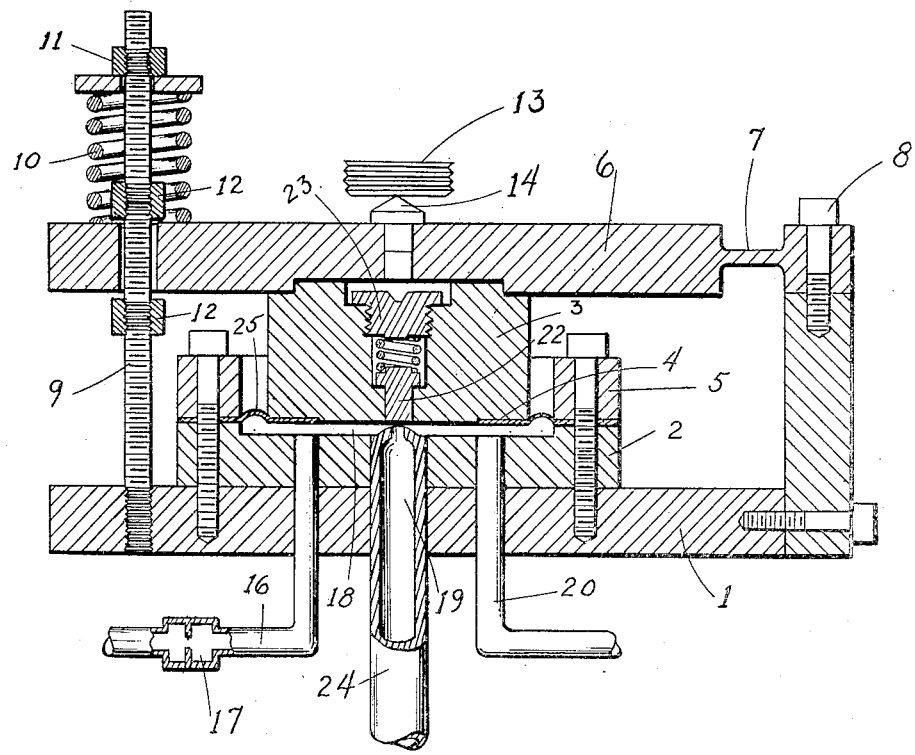
INVENTOR
Malcolm C. Tate
BY
ATTORNEY Patented Oct. 12, 1948

2,451,451

UNITED STATES PATENT OFFICE 2,451,451

WEIGHING SYSTEM

Malcolm C. Tate, Stamford, Conn., assignor to Baldwin Locomotive Works, a corporation of Pennsylvania Application July 20, 1944, Serial No. 545,780

1 Claim. (Cl. 137—139)

This invention relates generally to weighing apparatus and more particularly to a filling control for a hydraulic weighing capsule or "support" which is specifically shown herein as of the free span diaphragm type.

In weighing the test loads or forces in certain types of tests such as airplane model testing in wind tunnels or the like, the greatest precision of measurement is not only required but also it is necessary to maintain the model in a substantially predetermined position throughout variations in testing forces thereon. That is, the plane must not shift its position during the progress of the test. Hydraulic weighing systems heretofore proposed for this type of work have proven to be extremely sensitive to small changes in temperature and other operating conditions which tended to shift the plane unnecessarily or introduced undesirable variables.

It is an object of my invention to provide an improved filling control for maintaining a movable element of a weighing capsule in a substantially single predetermined position throughout full load range of the capsule and regardless of volumetric changes in the weighing fluid arising from temperature changes.

A further object is to provide an improved filling control for a hydraulic weighing capsule whereby the operation of the capsule will not be adversely affected if placed in a vacuum as is occasionally done in certain testing installations.

Another object is to provide a relatively simple, inexpensive and yet highly accurate, sensitive and compact filling control for a hydraulic weighing capsule of the free span diaphragm type.

Other objects and advantages will be more apparent to those skilled in the art from the following description of the accompanying drawing in which the figure is a sectional view of a hydraulic capsule employing my improved filling control.

In the drawing I have shown a stationary frame 1 upon which a capsule is mounted consisting of a capsule base 2 and a movable column 3 to which a free span diaphragm 4 is suitably secured as by soldering, clamping or other usual means. The outer marginal edge of the diaphragm is clamped to the base 2 by a ring 5 held by cap screws. The hydraulic capsule as shown is preferably circular in plan view and by reason of using my improved filling control system to be described the capsule can be made of extraordinarily small diameters. For a device of this kind such capsules have been made as small as two inches in diameter which is an extremely small size for a capsule of any real accuracy. To laterally stabilize the diaphragm and movable element 3 I provide a load plate 6 with a reduced flexure fulcrum 7 of substantially lateral width compared to its relatively thin depth. This plate is bolted to the frame 1 by screws 8. The outer end of this load plate has an opening through which a threaded bolt 9 extends from frame 1 to support an initial load spring 10. The initial load may be varied by a nut 11 while stop nuts 12 are provided on opposite sides of load plate 6 to limit the extent of upward or downward movement of the diaphragm. Load is applied from any suitable source through a member diagrammatically indicated at 13 to a center pin 14 secured to plate 6.

Hydraulic fluid is supplied from any suitable source such as a pump through a pipe 16 and an orifice 17 to a space 18 beneath the diaphragm and column 3. It will be noted that the fluid pressure supply pipe 16 discharges directly into the diaphragm chamber 18 and that this chamber in turn has a nozzle 19 discharging directly from the diaphragm chamber. The pressure within this chamber is conducted through a pipe 20 to any suitable indicator such as a Bourdon tube or air jet controlled servo-motor as shown in my Patent 2,325,345. In my present control system, the nozzle 19 functions to bleed fluid from the diaphragm chamber during which time fluid is continuously supplied to the chamber. To control the amount of fluid discharged through nozzle 19 in accordance with the load or in accordance with volumetric changes of the oil as a result of temperature conditions, the column 3 is used as a baffle overlying the nozzle. To prevent damage to the nozzle in the event of column 3 falling too low, I provide a yieldable baffle insert 22 in the center of column 3. This insert can be removed or be placed in position by removing a threaded plug 23.

In operation, a load applied at 14 will tend to cause baffle 22 to move downwardly toward nozzle 19 and thereby restrict discharge of fluid through nozzle 19 which discharges into a pipe 24 and thence back to the pump sump. This restriction will cause the pressure of fluid within the diaphragm chamber 18 to build up by reason of the fact that the supply pressure on the left side of orifice 17 is considerably greater than the maximum weighing pressure on the right side of the orifice. The increased pressure within the diaphragm chamber will cause the column 3 to move upwardly until a balance is established between the pressure in the diaphragm chamber and the applied load. Conversely, if the load decreases the pressure within the diaphragm chamber 18 will cause an upward movement of column 3 with consequent increased discharge of fluid through nozzle 19 until the piston is restored to substantially a predetermined position. If temperature variations should increase the volume of hydraulic fluid in the diaphragm chamber as well as in the pipe 20 and the associated weighing system this increased volume will cause column 3 to rise thereby increasing the discharge of flow through nozzle 19 until the diaphragm and column have been restored to said position. This nozzle arrangement is such that the diaphragm and piston have only a very small amount of movement throughout the load range and which in practical operation is of the order of only .001 to .002 of an inch maximum.

The arrangement of discharging the fluid supply directly into the diaphragm chamber and of having the nozzle 19 extend into and communicate directly with such chamber has provided a weighing capsule of extraordinary sensitivity, accuracy and responsiveness. The relatively small free span 25 of the diaphragm in combination with the function of employing a very heavy wall 2 and column 3 for the remainder of the weighing capsule insures minimum distortion of the capsule throughout its load range. Ordinarily, a free span diaphragm type weighing capsule is fraught with dangers incident to excessive movement especially in a capsule of such small diameter as the present disclosure is capable of having but I am able to most effectively overcome these hazards and difficulties in my present invention by using the internal nozzle control.

Another advantage of my improved arrangement is that if the capsule is placed below the level of the pump sump it is not necessary to employ an auxiliary pump for pumping discharged fluid from the nozzle back up to the sump. Instead the fluid from the diaphragm chamber will be under sufficient pressure to force the fluid through pipe 24 and up to the sump. Any back pressure within the pipe 24 will not have any appreciable effect upon the accuracy of the capsule for the reason that the area of the diaphragm is much larger than the nozzle port. Another advantage of my internal nozzle is that if the hydraulic capsule as a complete unit is placed in a vacuum the pipe 24 may lead through the walls of the vacuum container to the pump sump whereas in the usual bleeder type controls for weighing systems the fluid is discharged directly from the fluid system and cannot be conveniently returned through the vacuum to the sump.

From the foregoing disclosure it is seen that the load on the capsule column 3 is floated on the hydraulic weighing fluid and that this floating load controls the discharge through nozzle 19. The load is floated by a continuous supply of pressure fluid that is greater than necessary while the excess is continuously discharged and never cut off. This whole operation is practically instantaneous because it occurs wholly and directly within the diaphragm chamber and because of such operation and arrangement I am able to accomplish the many desirable results in a very small size diaphragm type device.

It will of course be understood that various changes in details of construction and arrangement of parts may be made by those skilled in the art without departing from the spirit of the invention as set forth in the appended claim.

I claim:

A load sensitive system comprising, a capsule having a base, a movable column connected by a diaphragm to said base to form a hydraulic diaphragm chamber, means for supplying hydraulic fluid directly to said chamber under pressure sufficient to maintain a continuous flow through the system at all times, a nozzle directly connected to said chamber for discharging fluid directly therefrom, means for controlling flow of fluid into said nozzle by the position of said column whereby variations in the position of the column from a substantially predetermined position causes either an increase or decrease of discharge through said nozzle thereby to cause the pressure within the diaphragm chamber to decrease or increase and accordingly maintain the column in a substantially constant position throughout either variations in applied load force or in the volume of hydraulic fluid arising from temperature changes, a load plate having a reduced flexure section rigidly secured at one end with respect to said base and its other end being secured to the column to move therewith for guiding the same, and preloading means for biasing said load plate and column in a direction tending to close said nozzle thereby to cause an increased pressure to be present in the diaphragm chamber prior to applying a load force to said plate.

MALCOLM C. TATE.

REFERENCES CITED

The following references are of record in the file of this patent:

UNITED STATES PATENTS

| Number | Name | Date |
|---|---|---|
| 1,196,735 | Gibson | Aug. 29, 1916 |
| 1,949,908 | Hawk | Mar. 6, 1934 |
| 2,013,810 | Shimek | Sept. 10, 1935 |
| 2,248,322 | Annia | July 8, 1941 |
| 2,265,114 | Hartley | Dec. 2, 1941 |
| 2,312,201 | Thompson | Feb. 23, 1943 |
| 2,349,228 | Wolff | May 16, 1944 |
| 2,357,272 | Tate | Aug. 29, 1944 |

FOREIGN PATENTS

| Number | Country | Date |
|---|---|---|
| 622,047 | Germany | Jan. 3, 1936 |